United States Patent [19]

Remer

[11] 4,017,325
[45] Apr. 12, 1977

[54] PIGMENT COMPOSITION

[75] Inventor: Robert K. Remer, Evanston, Ill.

[73] Assignee: Hull-Smith Chemicals, Inc., Des Plaines, Ill.

[22] Filed: Jan. 9, 1975

[21] Appl. No.: 539,824

Related U.S. Application Data

[60] Division of Ser. No. 392,671, Aug. 29, 1973, Pat. No. 3,880,666, which is a continuation of Ser. No. 129,603, March 30, 1971, abandoned.

[52] U.S. Cl. .......................... 106/288 Q; 106/292; 106/297; 106/299; 106/307; 106/301; 106/306
[51] Int. Cl.$^2$ .......................................... C09C 1/48
[58] Field of Search ............ 106/308 N, 288 Q, 72; 260/448 C, 448 R, 429

[56] References Cited

UNITED STATES PATENTS 2,665,285  1/1954  Johnson ............................ 260/429
2,883,357  4/1959  Hardy ............................ 260/448 C Primary Examiner—Winston A. Douglas
Assistant Examiner—J. V. Howard
Attorney, Agent, or Firm—Lockwood, Dewey, Zickert & Alex

[57] ABSTRACT

This invention provides an improved pigment composition which blends readily with hydrophylic and oleophylic vehicles, and which can be manufactured with highly reproducible color value.

A colorant, typically a dye or dye intermediate, is absorbed on an insoluble dithiocarbamate salt of a polyvalent metal. The dye-containing salts produced in this manner provide a pigment which is non-bleeding in hydrophylic or oleophylic vehicles. Aluminum and zirconium salts are the preferred salts, aluminum dithiocarbamate salts providing transparent pigments, and zirconium dithiocarbamate salts providing opaque pigments.

Pigment materials of this invention can be produced by absorbing dye or dye intermediate on a dithiocarbamate metal salt in an aqueous suspension thereof. Azo dye intermediates can be diazotized and coupled in an aqueous suspension of dithiocarbamate metal salt, in accordance with this invention.

Pigment materials of this invention can also be produced by mixing, bonding, reacting, or otherwise combining dithiocarbamate metal salts with insoluble finely divided solids such as carbon black, Indantharene pigments, phthalocyanine pigments, and the like, as well as organic or inorganic polymeric materials, typically metal oxide hydrates, clays, and the like.

2 Claims, No Drawings

PIGMENT COMPOSITION

This is a divisional application based on applicant's prior pending application Ser. No. 392,671, filed Aug. 29, 1973, now U.S. Letters Patent No. 3,880,666, which application in turn was a continuation of applicant's then copending application Ser. No. 129,603, filed Mar. 30, 1971, now abandoned.

This invention relates to a pigment composition which is useful as a pigment or as an intermediate in the manufacture of pigments.

It is an object of this invention to provide an improved pigment which can be used in the manufacture of inks, and the like, and which can be either opaque or transparent. It is also an object of this invention to provide a pigment with improved light-fastness properties. It is a further object of this invention to provide a pigment composition which can be used as an intermediate in the manufacture of other pigment compositions. It is an additional object of the present invention to provide a pigment composition which can be formed in connection with diazotization or coupling of azo dye intermediates to provide either an azo dye intermediate composition which can be used on a fabric or the like for coupling thereon, or to provide an azo dye intermediate pigment composition in which the azo dye is manufactured in the presence of the precipitate. It is a further object of the present invention to provide a pigment which can be manufactured by an inexpensive highly reproduceable method. It is another object of the present invention to provide a novel method of manufacturing azo dye stuffs, which method results in the production of greater color value per given amount of azo dye intermediate starting material. It is also an object of this invention to provide a pigment composition comprising a dithiocarbamate salt and a finely divided solid pigment material such as carbon black, Indantharene pigments, phthalocyanine pigments, and the like.

These and other objects which will be apparent hereinafter are achieved in accordance with this invention by a pigment composition comprising finely divided dithiocarbamate polyvalent metal salts with a coloring material or a dye intermediate dispersed therein.

In a preferred embodiment the metallic dithiocarbamate salt is produced in an alkaline aqueous medium as a reaction product of a mixture of an amine, carbon disulfide, and multi-valent metal ions, and in the preferred embodiment a dye or dye intermediate is present in the aqueous system either during or after the formation of the dithiocarbamate reaction product.

In another preferred embodiment, a pigment is provided which comprises metallic dithiocarbamate salt and a finely divided solid pigment material, such as, for example, carbon black, Indantharene pigments, phthalocyanine pigments, and the like.

In another preferred embodiment, a soluble dithiocarbamate salt and a reactable water-dispersible polymeric material are converted to finely divided pigment in the presence of a dye in an alkaline aqueous medium, by the addition of polyvalent metal ions thereto.

However, in some instances, the pigments comprising colorant and dithiocarbamate salts are formed in an acidic medium by admixing water-soluble dithiocarbamate salt, dye, and polyvalent metal ions which precipitate the dithiocarbamate in a slightly acidic aqueous medium. The reaction product is a finely divided powdery material which has been found to possess superior blending characteristics with respect to oleophylic vehicles, for example, in the manufacture of inks and the like. The powdery material is also bleed-resistant in both hydrophylic mediums and oleophylic vehicles.

Examples of amines that can be used in accordance with this invention in those embodiments in which the dithiocarbamate is formed in situ include dicyandiamide; urea; thiourea; 2-alkyl imidazoline in which the alkyl group contains 2–22 carbon atoms, particularly such 2-alkyl imidazolines which are also substituted in the first position with a hydroxy alkyl group such as hydroxyethyl; aliphatic primary, secondary and tertiary amines containing up to 20 carbons; aliphatic diamines such as 1, 3-propylene, N-tallow-1, 3-propylene diamines; hydroxylamines such as 2-(2-amino ethoxy)ethanol, amino ethanolamines and monoethanolamines; aniline, toluidine, and xylidene; cyclohexylamine and dicyclohexylamine, 1, 4-cyclohexane bis(methylamine); phenol diethanolamine, phenol ethanolamine, and N-tolyl diethanolamine, and the like. For facilitating distribution of many of these amines in water, these amines are suitably used in the form of salts such as acetates, diacetates, and the like. Alternatively previously prepared salts of dithiocarbamates, in which the amide bonded amine corresponds to one or more of the aforesaid amines, can be used.

The reaction between the amine and carbon disulfide is carried out in an aqueous alkaline medium, preferably, and it is to be understood that ammonium hydroxide can be used to provide the alkalinity. In this instance, the ammonium hydroxide can provide some, most, or all of the amine reactant, if desired.

The amount of carbon disulfide which is used in accordance with this invention is preferably that amount which is necessary to react with substantially all of the amine. From an economic point of view, the amines tend to be, generally speaking, relatively expensive ingredients. It is highly desirable that these compounds be substantially quantitatively recovered as product. Also, in the manufacture of pigment materials in which diazo dye materials are utilized, it is preferable that substantially no free amino groups be present in the substrate. Thus, in a preferred embodiment of the present invention carbon disulfide is added to the reaction material in at least slight excess over that amount which provides a stoichiometric reaction, and that amount can be readily determined by the appearance of a carbon disulfide odor over the reaction mixture. After the reaction is substantially complete, excess carbon disulfide can be removed by elevating the temperature of the reaction medium, and vaporizing carbon disulfide therefrom. In a preferred embodiment, the carbon disulfide is added to the other reaction materials as an aqueous carbon disulfide emulsion. Carbonyl sulfide can be added as an equivalent of carbon disulfide.

The carbon disulfide is preferably emulsified in water using an emulsifying agent such as a water-soluble ethylene oxide-reacted castor oil having a hydroxyl value of about 88 and an HLB value of about 88 (e.g. Baker T.M. Surfactol 365). Suitably, about 10 parts of such agents may be employed with 100 parts of water and an equal volume of carbon disulfide, with agitation to provide the highly reactive carbon disulfide-water emulsion for use in accordance with the preferred embodiment of this invention.

The multi-valent metal salts which are used in the method in accordance with this invention, either to bring down soluble dithiocarbamate salts or to bring down dithiocarbamates which are formed in situ, can be selected to provide either opaque or transparent pigment. For example, when aluminum sulfate is used as the source of the polyvalent metal ions in the reaction system in aqueous solution the resulting pigment will be transparent. If a solution of soluble barium salt is precipitated by an aluminum sulfate solution a highly transparent substrate, containing a product known as blanc fixe, is produced. However, if zinc chloride, zirconium oxychloride, lead nitrate, etc. are used as the source of polyvalent metal ions, particularly if used in excess amounts, the resulting substrate will be opaque. Furthermore, when zirconium oxychloride, zinc chloride, lead nitrate, etc. are used, the resulting pigment composition is, generally speaking, not capable of being resolubilized in alcohol, etc. However, when alumina hydrate is used, in many instances, the resulting pigment is soluble in alcohol or amines and thus can be resuspended in methyl ethyl ketone, acetone, propylene glycol, etc. for use in the manufacture or rotogravure ink, and the like. Also, essentially fluorescent pigments, in embodiments which utilize ions of zinc, copper, cadmium, for example, in accordance with this invention, in conjunction with any of the basic fluorescent dyes, UV absorber dyes, optical bleaching dyes, and the like, provide a material which is highly useful as a coating material in the manufacture of television screens, and the like. It should be emphasized, however, that transparent pigments referred to above are produced in a method utilizing alumina hydrate, and that if aluminum silicate is added to the reaction mixture the resulting substrate will tend to be somewhat opaque.

The aqueous reaction solution, in accordance with the preferred embodiment of this invention, is alkaline and the metal polyvalent ions are preferably added to such solution in the form of slightly acidified aqueous solutions of the metal polyvalent ion. The preferred aqueous reaction solution of this invention is ammoniacal, and as indicated above, the ammonium hydroxide can provide some or most of the amine ingredient referred to hereinbefore. Sufficient alkalinity of the reaction system is preferably provided, to assure precipitation of excess metal ions.

It is to be understood that some dithiocarbamate metal salts are highly colored, and it is to be understood that the highly colored salts are used only in those embodiments in which the color of the salt itself is compatible with the pigment manufacturing objective. However, many of the dithiocarbamate salts are colorless, or white, e.g. aluminum, and zirconium salts, and these are compatible with virtually any dye.

In methods of manufacture of this invention, which will be further described with the aid of the examples herein, substantially quantitative recovery of organic solid materials is achieved. The reactions are carried out in aqueous systems, and dyes or dye intermediates can be added to the reaction system at any of a number of stages of the manufacture of the pigment of this invention. For example, in accordance with this invention, a color-free finely divided water-insoluble dithiocarbamate salt can be produced in any known manner, for example as described herein in an aqueous alkaline medium, and the insoluble, separated, and washed salt resuspended in water and water-dispersed dye absorbed thereon in either acidic, neutral or alkaline systems. In an alternative embodiment of this invention, the polyvalent metal ion, the amine, and the dye or dye intermediate are admixed in an alkaline aqueous system, and the pigment of this invention is precipitated in situ on the formed dithiocarbamate salt after the addition of carbon disulfide and, possibly, additional polyvalent metal ion. In another alternative embodiment, the polyvalent metal ion, the amine compound, and carbon disulfide are admixed in an alkaline aqueous system to provide an aqueous suspension of finely divided color-free substrate salt of this invention, and a dye or dye intermediate is added directly to the resulting suspension for substantially complete absorption of the dye or dye intermediate thereon. On the other hand, a color-free finely divided aqueous soluble dithiocarbamate salt can be separated from its aqueous mother liquor, by decantation and filtration. The solids can be purified and dried, if desired. In a preferred embodiment of this invention the resulting separated color-free washed finely divided solids can be redissolved in water and admixed with dye or dye intermediates and with polyvalent metal ions for complete absorption of the dye or dye intermediate thereon. Further dye-producing chemical reactions can be carried out with such materials in which dye intermediates are absorbed, in the presence of the dithiocarbamate salts.

In addition, the pigments of this invention can include polymeric materials, preferably reactable organic polymeric or high molecular weight materials, or inorganic polymeric materials such as alumina or zirconia hydrate, clays, and the like.

Water-dispersible or ammoniacal dispersible resin materials such as those widely commercially available in the form of powders and the like can be used in the pigment of this invention. Such water-dispersible reactive polymer compounds for use with this invention include commercially available water-dispersible low molecular weight copolymers of styrene and maleic anhydride (preferably those having a molecular weight typically from 1600 to 2200) and other water-dispersible carboxyl polymeric materials such as rosin acid and salts thereof. It is preferred that the carboxyl polymeric materials be selected from those high molecular weight materials or polymeric materials which have one or more aliphatic unsaturations therein, e.g. rosin acids, abietic acid, maleic and acrylic polymers and copolymers, metal cross-linked acrylic polymers, styrene copolymers and the like. Other water-dispersible reactive polymer compounds which can be used in the pigment of this invention include water or ammoniacal-dispersible epoxy, polyamide, polyester, cellulosic polymers, e.g. alpha-cellulose, natural amino-containing proteinaceous materials such as gelatin, soya protein, casein and the like. The amount of water-dispersible reactive resinous polymer compound used in accordance with this invention is not critical.

Some polyvalent metal ions are known to form inorganic gel polymer systems in water, such as, for example, alumina hydrate, gel-forming clays, etc. and such inorganic polymeric materials can be included as ingredients in the pigments of this invention. Such inorganic polymeric materials include alumina hydrate, gel-forming clays, and other inorganic water-dispersible polymeric materials.

The pigments of this invention are relatively heat stable and can be heated to temperatures at least as high as 400° F, generally speaking, without disintegration or degradation. They can be heated to temperatures conventionally used, e.g. 250°–300° F for the purpose of drying pigments to provide a substantially dry pigment. However, the pigment produced in accordance with this invention can be used as an aqueous-wet filter cake by admixing the filter cake with lipophylic vehicles by flushing-in, using conventional mixing and heating procedures.

On the other hand, substantially dry pigments in accordance with this invention are found to be surprisingly dispersible in lipophylic vehicles such as alkyd varnishes, nitrocellulose laquers, and the like. As indicated above, absorbent compositions of this invention utilizing alumina hydrate produce transparent inks, whereas compositions produced from embodiments of this invention using zirconium oxychloride in the aqueous reaction system produce opaque inks.

In the following examples all parts are expressed in parts by weight, and all percentages or percent (%) are expressed in percent by weight based on the weight of the mixture, unless otherwise indicated and all temperatures are expressed in degrees Fahrenheit.

The following examples are provided for the purpose of illustration only, and it is not intended that the invention be limited thereto. For example, other reaction temperatures, and systems, in which the dithiocarbamate salt is formed, can be employed. Carbon disulfide is added at 100°–110° F in the examples, but can be added at a lower temperature, or at a higher temperature, providing the system is equipped to reflux vaporized carbon disulfide, or is pressurized, or otherwise equipped to retain the carbon disulfide.

EXAMPLE 1

Tap water (4000 parts), and concentrated sodium silicate solution (50 parts) are admixed with a small amount of silicone anti-foam material (T.M. Anti-Foam 60). The resulting sodium silicate solution is heated to 160° F and ammonium hydroxide solution (26° Be — 135 parts) are added. Dicyandiamide (100 parts) is added to provide "Mixture A". Separately, a diamine (T.M. Adogen 570-A— 100 parts) is melted. In this condition it has the appearance of coconut oil. This material is principally N-tolyl 1, 3-propyldiamine. This material is added when melted to Mixture A to produce a mixture identified hereinafter as Mixture B.

An aluminum sulfate solution is separately prepared by dissolving aluminum sulfate (150 parts) with tap water (1800 parts). A portion of the aluminum sulfate solution (1000 parts) is slowly added to the material identified as Mixture B and the resulting admixture is cooled to about 100° F. The resulting mixture is referred to hereinafter as Mixture C. In a separate container carbon disulfide (127 parts) and water (100 parts) and surfactant (Surfactol 36 T.L. 3–30, T.M. Baker, an ethoxylated castor oil surfactant) is admixed and agitated to form a milky white emulsion. The resulting emulsion is then added to Mixture C and an extreme thickening occurs and new particles are formed. No odor of carbon disulfide comes from the resulting admixture. The remaining portion of the aluminum sulfate solution (800 parts) is added and the pigment solids form. The resulting admixture shall be referred to hereinafter as the substrate suspension.

EXAMPLE 2

The purpose of this example is to illustrate the production of pigment in accordance with this invention. Azosol Brilliant Yellow (20 parts — 8 GF), methyl cellosolve (300 parts) are admixed and heated to solubilize the dye. The dye is an azo dye classified as an oil-soluble acid dye. The resulting admixture, referred to hereinafter as the dye solution of Example 2, is admixed with the "substrate suspension" (3500 parts) referred to in Example 1. The color goes onto the substrate immediately and when a portion of the colored material is added to filter paper, the filtrate is colorless showing complete bonding of the dye to the substrate and no "bleeding". Upon filtration and washing, a dry pigment powder is produced without grinding upon drying at 300° F.

EXAMPLE 3

The purpose of this example is to illustrate the use of the substrate produced by Example 1 with a basic dye. Rhodamine F3B is an extremely brilliant dye. The Rhodamine dye (10 parts) and methyl cellosolve (3 parts) are admixed and heated to approximately 100° F to facilitate solubilizing of the dye. The resulting solution of the Rhodamine dye referred to hereinafter as the Rhodamine dye solution is admixed to the substrate suspension produced in accordance with Example 1. Immediately upon admixing, color is imparted to the substrate solids and, when the mixture is applied to filter paper there is no bleed whatsoever through the filter paper.

EXAMPLE 4

The procedure of Example 1 is repeated, except that prior to the addition of carbon disulfide solution, the dye solution produced in accordance with Example 2, was added to the reaction mixture. Upon addition of the carbon disulfide as in Example 1 thereto, the resulting substrate was colorless, and no bleed of the dye was evident upon being tested on filter paper.

EXAMPLE 5

The procedure of Example 1 is repeated except that immediately prior to the addition of carbon disulfide emulsion, the Rhodamine dye solution produced in accordance with the procedure of Example 3 is added thereto. Upon addition of the carbon disulfide emulsion a pigment is produced, and no bleed is observed when the pigment is tested on filter paper.

EXAMPLE 6

The purpose of this example is to illustrate the incorporation of a diazo type dye intermediate on the substrate of the invention, and the subsequent coupling in the presence of the substrate to produce diazo dye colored pigment of this invention.

Water (4000 parts) is heated to 160° F and concentrated sodium silicate solution (50 parts), a silicone emulsion anti-foaming agents (5 parts — G.E. T.M. Silicone Anti-Foam 60) and ammonium hydroxide (135 parts — 26° Be) is added and stirred. To the resulting admixture dicyandiamide (20 parts) and "Monazolene O" (50 parts) are added thereto. Monazolene O is a surface active 1-hydroxyethyl 2-alkyl imidazoline in which the alkyl is an unsaturated 17 carbon chain. Paranitroaniline (200 parts) is added thereto and mixing is continued for 10 additional minutes. The resulting mixture is referred to hereinafter as Mixture 6-A.

An aluminum sulfate solution (iron free) is prepared separately dissolving aluminum sulfate (150 parts) in water (1800 parts) at 120° F. To this, sulfuric acid (46 parts) diluted with water (175 parts) is added. The resulting admixture is referred to hereinafter as the aluminum sulfate solution. A portion of the aluminum sulfate solution (1000 parts) is added to the Mixture 6-A and the resulting admixture is cooled to 100° F and the cooled solution is referred to as 6-B hereinafter.

A carbon disulfide emulsion is prepared as described in Example 1, and the resulting emulsion is then added to Mixture 6-B. Thereafter another portion of the aluminum sulfate solution (1000 parts) is added and the entire volume is transferred to a larger container and cooled to 50° F by addition of ice thereto. The cooled admixture is referred to hereinafter as Mixture 6-C.

The following solution is prepared for the diazotization of the substrate Mixture 6-C. To a first solution of concentrated hydrochloric acid (358 parts) in water (600 parts), a second solution of sodium nitrite (100 parts) dissolved in water (400 parts), is added. The resulting diazotizing mixture is thoroughly mixed with Mixture 6-C and tested in the conventional manner. After the diazotizing reaction is complete, the mineral acid is neutralized. To neutralize the excess mineral acid, sodium acetate (250 parts) is dissolved in water (400 parts). This solution is added to the sodium nitrite solution until neutral tests to congo red paper is observed. The resulting mixture is referred to in this example as the diazo substrate. Separate batches are coupled as set forth in Coupling 6-I and Coupling 6-II, below.

COUPLING 6-I

Naphthol (AF Supra GAF — 100 parts) is pasted with methyl cellosolve or alcohol (150 parts). Sodium hydroxide (40 parts) is dissolved in water (700 parts) and the sodium hydroxide solution is added to the naphthol solution and the resulting admixture is heated to 180° F. The resulting admixture forms a clear solution. The resulting admixture is diluted with water to bring the weight of the batch to about 1800 parts by weight. The resulting naphthol solution is added to a batch of diazo substrate produced in accordance with this example and mixed 30 minutes. The resulting admixture is filtered and washed and filtered again to provide a pigment which evidences no bleed in a filter paper test.

COUPLING 6-II

Methyl cellosolve (200 parts) is admixed with Monazolene O (which was described earlier — 50 parts) and the resulting admixture is heated to 180° F. The heated admixture is added to beta-naphthol (200 parts) and a clear solution results. Water is added to the resulting solution to bring the batch to 1800 parts, and this procedure is used in accordance with the procedure of this example as described under Coupling 6-II. Color forms immediately and the resulting pigment produces no bleed in a filter paper test.

EXAMPLE 7

The procedure of Example 6 is repeated except that the paranitroaniline was omitted from the reaction medium in the manufacture of the substrate suspension, and the beta-naphthol is substituted therefor. The diazotizing step is carried out by diazotizing the paranitroaniline in a separate reaction medium and the diazotizing agents described in Example 6 are used. Upon combining of the diazotized paranitroaniline mixture and the beta-naphthol-containing substrate suspension, color is formed immediately. A filter paper test of the mixture was performed and no bleed is observed.

EXAMPLE 8

Water (4000 parts), concentrated sodium silicate solution (50 parts) and a small amount of silicone antifoam material (T.M. Anti-Foam 60) are admixed. The resulting sodium silicate solution is heated to 160° F and a dithiocarbamate salt is added, the salt having the formula

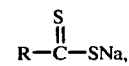

wherein R represents an amide linkage with the terminal amine of N-tolyl-1, 3-propyl diamine. Hiltacid Blue liquid (60 parts) is added thereto and mixed thoroughly for approximately 5 minutes. An aluminum sulfate solution is prepared separately by dissolving aluminum sulfate (150 parts) with water (1800 parts). To this, a second solution of concentrated sulfuric acid (46 parts) diluted with water (175 parts) is added. The resulting admixture is referred to hereinafter as the aluminum sulfate solution. A portion of the aluminum sulfate solution (900 parts) is added to the dye-containing solution. The resulting admixture is cooled to a temperature in the range 100°–110° F. The remaining portion of the aluminum sulfate solution is added thereto. The dye is observed to be completely absorbed on the resulting solid. The solids are separated by decantation, washing, and filtering and the resulting pigment filter cake is found to be readily dispersible by flushing in alkyd vehicle, and this pigment is found to be transparent, and to have excellent light features.

EXAMPLE 9

The procedure of Example 8 is repeated except that instead of an aluminum sulfate solution a zirconium oxychloride solution is prepared and used instead. The zirconium oxychloride solution is prepared by dissolving zirconium oxychloride (150 parts) in water (1800 parts) at 70° F. Also, instead of the Hiltamine dye used in Example 8, the present example utilizes a Rhodamine dye solution. The dye solution is formed in a separate container by admixing Rhodamine B (5 parts), Rhodamine 6 GDN (5 parts) and methyl cellosolve (100 parts) to dissolve the dye. The resulting dye solution is admixed with the dithiocarbamate salt suspension at 160° F. The dye is found to be removed from the water and uniformly and completely absorbed on the suspended substrate solids when the first portion of zirconium solution is added. The balance of the zirconium oxychloride solution is added, and the resulting mixture is thereafter permitted to settle, and after decantation, the solids are washed, and filtered. The resulting press cake is found to be readily dispersed or blended with alkyd vehicle using convention anl flushing-in technique, and this pigment is found to be opaque and to possess excellent light fastness.

EXAMPLE 10

The procedure of Example 1 is repeated except that dissolved lead nitrate is substituted for a portion of the aluminum sulfate, and the resulting washed substrate is then admixed with a chromate solution. Color is immediately formed on the substrate to produce a lead chromate pigment.

EXAMPLE 11

The procedure of Example 8 is repeated, except that, in addition to the other ingredients added to the water solution prior to the addition of aluminum sulfate, a rosin-derived synthetic carboxylic unsaturated mixture which is principally abietic acid (500 parts), and ammonium hydroxide solution (26° Be — 137 parts) are admixed and the mixture is stirred until the resinous carboxylic acid powder is dissolved. After the aluminum sulfate solution is added, it is noted that all of the resin is coprecipitated with the pigment of this invention.

EXAMPLE 12

The procedure of Example 8 is repeated except that the dye is added after the first portion of aluminum sulfate solution is added. The dye is absorbed on the formed substrate immediately.

EXAMPLE 13

The procedure of Example 9 is repeated except that the dye is added after the addition of the first portion of the zirconium chloride solution. The dye is immediately absorbed on the formed substrate solids.

In each of the examples referred to hereinbefore the organic ingredients are substantially quantitatively recovered in the solid pigments.

This invention provides a new method of making diazo dye pigments either by absorbing the coupled dye on the substrate, adding or absorbing either the diazo or naphthol or amine moieties on substrate by addition of the respective moiety to the reaction mixture in the method of the invention, by addition of these moieties to an uncolored substrate, or by diazotizing the azo intermediates in the presence of the substrate either after the substrate is recovered, or while the substrate is still in its mother reaction liquor. Furthermore, coupling of azo dye intermediates which are respectively absorbed on respective substrates of this invention, by mixing the substrates produces an extremely rapid coupling reaction. As indicated above it has been found that for a given amount of azo dye intermediate, the resulting pigment, when made in accordance with this invention, has a higher color value than the color value which would have been achieved in the same amount of intermediates used in the manufacture of the dye separately, that is, prior to absorption on a color-free substrate in accordance with this invention or on other substrates.

To assist one with ordinary skill in the art to practice the invention in its broadest aspects the following general principles are applicable. To determine a preferred amount of carbon disulfide for use in accordance with a preferred embodiment of this invention, in which the dithiocarbamate salt is formed in situ, a small scale test can be run in which particular amounts of selected ingredients from the respective ingredient groups referred to above are admixed, for example by following general procedure of Example 1, up to the step at which carbon disulfide is added. At that point, incremental quantities of carbon disulfide are added (preferably as an aqueous emulsion) while the reaction mixture is maintained at a temperature in the range 100°–110° F. The incremental addition is continued until an odor of carbon disulfide is detectable emanating therefrom. A record is made of the total amount of carbon disulfide added, and for the purposes of the preferred embodiments of this invention, an amount of carbon disulfide which is between 90% and 110% of the total amount of the carbon disulfide added prior to odor emanation, is the preferred amount. Mixtures utilizing an excess of carbon disulfide are heated to 120° F in order to remove any excess, unreacted carbon disulfide.

As indicated above, dithiocarbamate salts are preferably added in water-soluble form, e.g. as the sodium or ammonium salts preferably in slightly alkaline solutions, and the amount of polyvalent metal ions which is added is at least that amount which is necessary to bring about complete precipitation of the substrate of this invention. The amount is not critical, however. An insufficient amount will merely result in less than quantitative recovery of the product, and copious excesses of polyvalent metal salts can be added without detrimental effect. However, for uniformity from batch to batch, the same amounts, whatever they be, are added. It is to be understood of course that metals which are known to be antagonistic to a particular dye should not be used in the manufacture of the pigments having the particular dye. Some metal salts of dithiocarbamates are highly colored, and these particular colored salts can be used in embodiments in which the color of the salts would not adversely affect the color of the desired pigment. Other dithiocarbamate salts such as the aluminum and zirconium salts are virtually white, and can be used with any dyes, including azo, acidic, basic and natural dyes, and with any chemically compatible colorants.

Thus the multivalent metal ions which can be used to form the dithiocarbamate salts in accordance with this invention can be selected to provide either opaque or transparent pigments, as desired, in accordance with the requirements of the final product. Typically, these multi-valent metal ions can include, for example, aluminum, zirconium, strontiu, zinc, lead, molybdenum, tungsten, phosphomolybdate, barium, copper, cadmium, and other polyvalent ions. Metal releasing chelates, e.g. zinc chelates, or water-soluble ionic metal compounds can be used as the preferred sources of metal ions in accordance with this invention. The dithiocarbamate salts have been found to provide a substrate which exhibits extremely efficient fixing of colorants, colorant intermediates, optical brighteners, ultraviolet absorbers, and the like. By fixing is meant absorption or bonding whether physical or chemical with the result that the fixed material is substantially removed from a medium, and is substantially adhered to the substrate, e.g. to the dithiocarbamate salt. Ultraviolet light inhibitors or absorbers which are absorbed on the substrate of the present invention include the benzophenones, benzotriazols, silicates, and others including resorcinol monobenzoate, hexamethylphosphoric triamide, substituted acrylonitriles, and metal organic complexes. For example, 4-methoxy-2-hydroxybenzophenone, 4-octyloxy-2-hydroxybenzophenone, 4-dodecyloxy-2-hydroxybenzophenone, 2,4-dihydroxybenzophenone, 4-methoxy-2,2'-dihydroxybenzophenone, 4-octyloxy-2,2'-dihydroxybenzophenone, 4-methoxy-2-hydroxy-5-carboxybenzophenone, 4-methoxy-2-hydroxy-5-sulfobenzophenone trihydrate, 2,4-dibenzoylresorcinol, 5-chloro-2-hydroxybenzophenone, 4,4'-dimethoxy-2,2'-dihydroxybenzophenone, 2,2',4,4'-tetrahydroxybenzophenone, 4-methoxy-2- hydroxybenzophenone-5-sulfonic acid, sodium-4,4'-dimethoxy-2,2'-dimethoxy-5-sulfobenzophenone, 2(2'hydroxy-5'-methylphenyl)benzotriazole, alkylated (2'-hydroxy-5'-phenyl)benzotriazoles, phenyl salicylate, 4-5-butylphenyl salicylate, p-octylphenyl salicylate.

Fluorescent whitening agents and brighteners are also efficiently fixed on the substrate of the present invention. For example, the stilbene derivatives and equivalent materials conventionally used for this purpose and well known to those skilled in this art are efficiently fixed.

The dithiocarbamate salts can be admixed with, bonded to, absorbed on, or otherwise combined with finely divided solid materials without departing from the spirit and scope of the present invention. Carbon black is a preferred finely divided solid material in news and publication ink. Additional solid materials which can be admixed with, or otherwise combined with the dithiocarbamate metal salts of this invention include, for example, the clay minerals, vegetable carbon, aluminum powder, gas carbon, insoluble metal oxides, carbonates, sulfates, and silicates. Similarly natural and synthetic oxides, carbonates, sulfates, and silicates of aluminum, barium, calcium, magnesium, silicon, titanium, and zirconium are also suitable. Microcrystalline cellulose, ultra-fine polyolefin powders, water-dispersible epoxy, polyamides, polyester, and other high molecular weight organic materials may also be used.

The clay minerals are represented by the kaolinite group, the montmorillonite group, the potash clay or hydrous micro group, attapulgite, and the like. Representative available materials include china clay, Ultra-White 90 kaolin clay, and Attagel Attipulgus clays (both from Minerals and Chemicals Phillip Corporation), Min-U-Gel colloidal attapulgite (Floridin Company).

Typical of the natural and synthetic oxides, carbonates, sulfates, and silicates of barium, calcium, magnesium, silicon and titanium which, in accordance with the invention, can be admixed or otherwise combined with the dithiocarbamate salts of this invention, are titanium dioxide, zinc oxide, calcium carbonate, calcium magnesium carbonate, calcium sulfate, calcium silicate, barium carbonate, barium sulfate, magnesium carbonate, magnesium silicate, Zeolex synthetic Silico-Aluminate (J. N. Huber Company), colloidal silica such as Nalcoags (Nalco Chemical Company), micron-sized silica such as the Syloids (W. R. Grace & Company) and colloidal aluminas such as Baymal (DuPont).

The following additional illustrative examples are given to further illustrate compositions and methods in accordance with this invention utilizing finely divided insoluble solids.

EXAMPLE 14

The process of Example 1 is repeated except that prior to the first addition of aluminum sulfate solution, 500 parts of finely divided unreduced Indantharene Blue (anthraquinone) is admixed and maintained in suspension in the aqueous medium by high shear stirring. All the Indantharene Blue is recovered with the precipitate produced in accordance with this example.

EXAMPLE 15

The process of Example 1 is repeated except that prior to the first addition of the aluminum sulfate solution, 500 parts of carbon black are admixed into the aqueous mixture, and is maintained in suspension by high shear stirring. Again, all of the carbon black is recovered with the precipitate in accordance with this example. The precipitated salts act as an efficient extender for the resulting pigment composition which has the advantage that it is highly receptive to toners and other color modifiers for modifying or altering the black color thereof.

EXAMPLE 16

The process of Example 1 is repeated except that, prior to the first addition of aluminum sulfate solution, 500 parts Phthalocyanine Blue is added. All of the Phthalocyanine Blue is recovered with the resulting pigment composition precipitate.

The latter examples further illustrate compositions and methods of this invention which utilize insoluble finely divided solid pigment to provide compositions which are useful compositions of matter either for direct use as a pigment, or as a raw material for further processing, by means of additional mixing or chemical reaction steps, for the purpose of manufacturing a desired pigment therefrom. Thus, the present invention utilizes any dye or dye intermediate as well as water-insoluble colorants, generally referred to as pigments in the art.

While in the foregoing specification various embodiments of the present invention have been described, it will be apparent to those skilled in this art that modifications and variations therefrom may be made without departing from the spirit and scope of this invention. Accordingly, the subject invention is to be limited only by the scope of the appended claims.

I claim:

1. A pigment composition comprising a substrate and a colorant, which substrate is an insoluble multi-valent metal salt of dithiocarbamate formed in an aqueous alkaline medium by the reaction of polyvalent metal ions, amine or amide compounds, carbon disulfide, and water-dispersible inorganic reactive polymeric material.

2. The pigment composition of claim 1 in which the polymeric material is selected from the group metal oxide hydrate, and clay.

* * * * *